(12) United States Patent
Ogale et al.

(10) Patent No.: US 8,913,083 B1
(45) Date of Patent: Dec. 16, 2014

(54) SYSTEM AND METHOD OF GENERATING A VIEW FOR A POINT OF INTEREST

(75) Inventors: Abhijit S. Ogale, Mountain View, CA (US); Augusto Roman, Mountain View, CA (US); Owen Brydon, Mountain View, CA (US)

(73) Assignee: Google Inc., Mountain View, CA (US)

( * ) Notice: Subject to any disclaimer, the term of this patent is extended or adjusted under 35 U.S.C. 154(b) by 696 days.

(21) Appl. No.: 13/181,822

(22) Filed: Jul. 13, 2011

Related U.S. Application Data (60) Provisional application No. 61/363,770, filed on Jul. 13, 2010.

(51) Int. Cl.
*G09G 5/00* (2006.01)

(52) U.S. Cl.
USPC .......................................................... 345/632

(58) Field of Classification Search
CPC ..... G06T 17/05; G06T 3/4038; G06T 19/003; G06F 3/04815; G06F 17/30241; G01C 21/3679; G01C 21/3682; G01C 21/32; H04N 5/23238
USPC .......................................................... 345/632
See application file for complete search history.

(56) References Cited

U.S. PATENT DOCUMENTS

| | | | |
|---|---|---|---|
| 7,359,797 B2 * | 4/2008 | Dorfman et al. | 701/408 |
| 2005/0177303 A1 * | 8/2005 | Han | 701/209 |
| 2008/0062250 A1 * | 3/2008 | Rye et al. | 348/14.01 |
| 2008/0288893 A1 * | 11/2008 | Nikkels et al. | 715/848 |
| 2008/0292213 A1 * | 11/2008 | Chau | 382/294 |
| 2009/0110302 A1 * | 4/2009 | Snow | 382/225 |
| 2009/0116764 A1 * | 5/2009 | Liu et al. | 382/284 |

* cited by examiner

*Primary Examiner* — Kee M Tung
*Assistant Examiner* — Nicholas R Wilson
(74) *Attorney, Agent, or Firm* — Lerner, David, Littenberg, Krumholz & Mentlik, LLP (57) ABSTRACT

Systems and methods are provided for manually finding a view for a geographic object in a street level image and associating the view with the geographic object. Information related to a geographic object and a first image related to the geographic object is displayed. User inputs indicating a presence of the geographic object in the image and user input indicating a viewpoint within the image are received and processed. An association of the viewpoint, the image and the geographic object is made and the association is stored in a database. A second image is determined, based on the association, as a default initial image to be displayed for the geographic object in a mapping application.

18 Claims, 7 Drawing Sheets

FIG. 6

SYSTEM AND METHOD OF GENERATING A VIEW FOR A POINT OF INTEREST

BACKGROUND OF THE INVENTION

The present invention relates generally to associating images with geographic locations in a mapping application. More particularly, aspects of the invention relate to selecting one or more representative views in street level imagery for a point of interest in a mapping application and associating the representative view and the point of interest.

Street level images of geographic locations may be displayed through map services such as Google Maps. These images, identified in Google Maps as "Street Views", typically comprise photographs of buildings, surrounding neighborhoods, and other features to allow a user to view a geographic location from a person's perspective as compared to a top-down map perspective.

Images showing a particular geographic location, such as a museum, a gourmet shop, or another type of point of interest ("POI"), in a representative way may be displayed to the users within a mapping application to enhance the user's experience. Business owners may use a map service to store views of their businesses and display the best views to the users. These views may be obtained by selecting photographs provided to the map services. They may also be obtained by taking a view from existing street level images.

SUMMARY OF THE INVENTION

Aspects of the invention provide systems and methods of generating a view for a geographic object and associating the view with the geographic object.

In one embodiment of the invention, a method for generating a view for a geographic object is provided. The method comprises displaying, on an electronic display, information related to a geographic object and a first image related to the geographic object. The method also comprises receiving user input indicating a presence of the geographic object in the image and receiving user input indicating a viewpoint within the image. The method further comprises associating, with a processor, the viewpoint, the image and the geographic object; and storing the association in a database.

In one example, the method comprises determining a priority value for the geographic object relative to other geographic objects in a plurality of geographic objects.

In another example, determining the priority value comprises determining a popularity level of the geographic object relative to other geographic objects.

In a further example, the method comprises displaying the plurality of geographic objects based on the determined priority value of each respective geographic object.

In one alternative, the method comprises dividing the plurality of geographic objects into clusters based on geolocation of each respective geographic object.

In another alternative, the method comprises determining priority value for each respective cluster and displaying the clusters based on the determined priority values.

In a further alternative, the viewpoint comprises parameters indicating a position within the image and indicating user operations within the image.

In yet another alternative, the user operations comprise yaw, pitch, zoom, and bounding-box drawing operations.

In one example, the method comprises determining a second image based on the association as a default initial image to be displayed for the geographic object in a mapping application and displaying the second image in the mapping application.

In another example, the method comprises displaying a plurality of additional images related to the geographic object.

In accordance with another embodiment, a system of generating a view for a geographic object is provided. The system comprises an electronic display device and a user input device. The system also comprises a processor in communication with the electronic display device and the user input device. The processor is configured to process information received from the user input device. The system further comprises a memory coupled to the processor. The memory stores instructions executable by the processor. The instructions comprise displaying, on the electronic display, information related to a geographic object and a first image related to the geographic object, and receiving, from the user input device, user input indicating a presence of the geographic object in the image. The instructions also comprise receiving, from the user input device, user input indicating a viewpoint within the image; associating the viewpoint, the image and the geographic object; and storing the association in the memory.

In one example, the system comprises instructions for determining priority value for the geographic object relative to other geographic objects in a plurality of geographic objects.

In another example, the instructions for determining priority value comprise instructions for determining popularity level of the geographic object relative to other geographic objects.

In a further example, the system comprises instructions for displaying on the electronic display device the plurality of geographic objects based on the determined priority value of each respective geographic object.

In one alternative, the system comprises instructions for dividing the plurality of geographic objects into clusters based on geolocation of each respective geographic object.

In another alternative, the system comprises instructions for determining a priority value for each respective cluster and instructions for displaying the clusters based on the determined priority values on the electronic display device.

In yet another alternative, the viewpoint comprises parameters indicating a position within the image and indicating user operations within the image.

In a further alternative, the user operations comprise yaw, pitch, zoom and bounding-box drawing operations performed by the user input device.

In one example, the system comprises instructions for determining a second image based on the association as a default initial image to be displayed for the geographic object in a mapping application and instructions for displaying the second image in the mapping application on the electronic display device.

In another example, the system comprises instructions for displaying a plurality of additional images related to the geographic object.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

In accordance with aspects of the invention, a system clusters POI by street segment. The system generates task for each cluster. Each task contains information related to the POI, including one or more street level images. The system presents to operators each task as a question or a group of questions on a graphical user interface, which shows street level images of a respective cluster. Operators may navigate the images to find each POI in the cluster and to select a best view or an otherwise desired view for each POI. The selected view associated with the respective POI is recorded.

Figure 1:
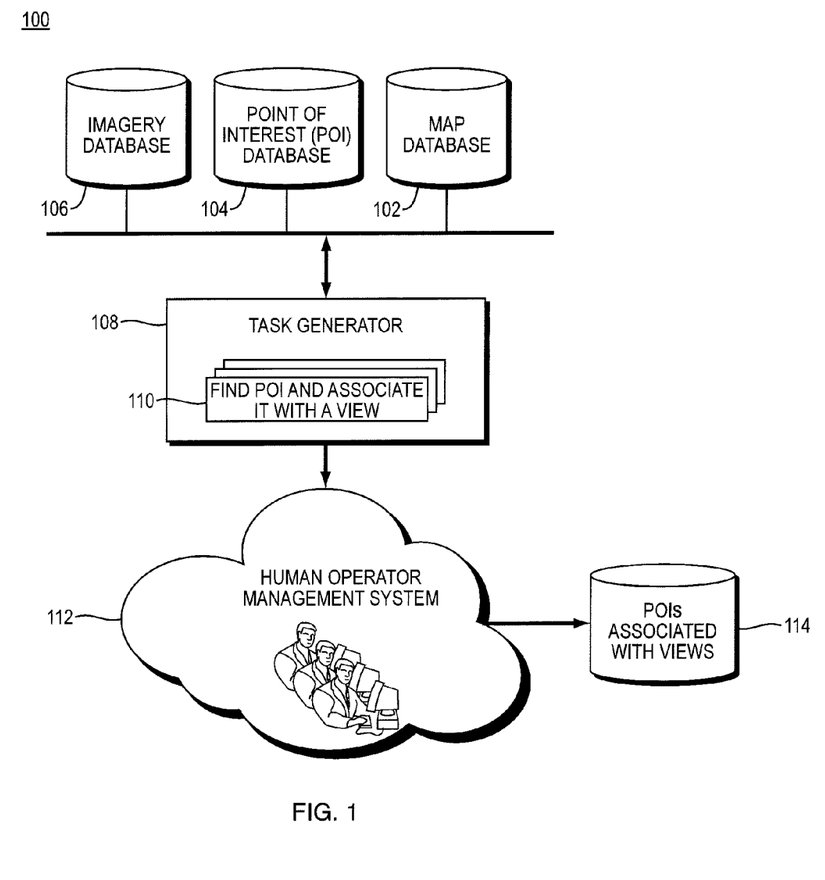
FIG. 1 is a pictorial diagram of a system in accordance with aspects of the invention.
Figure 2:
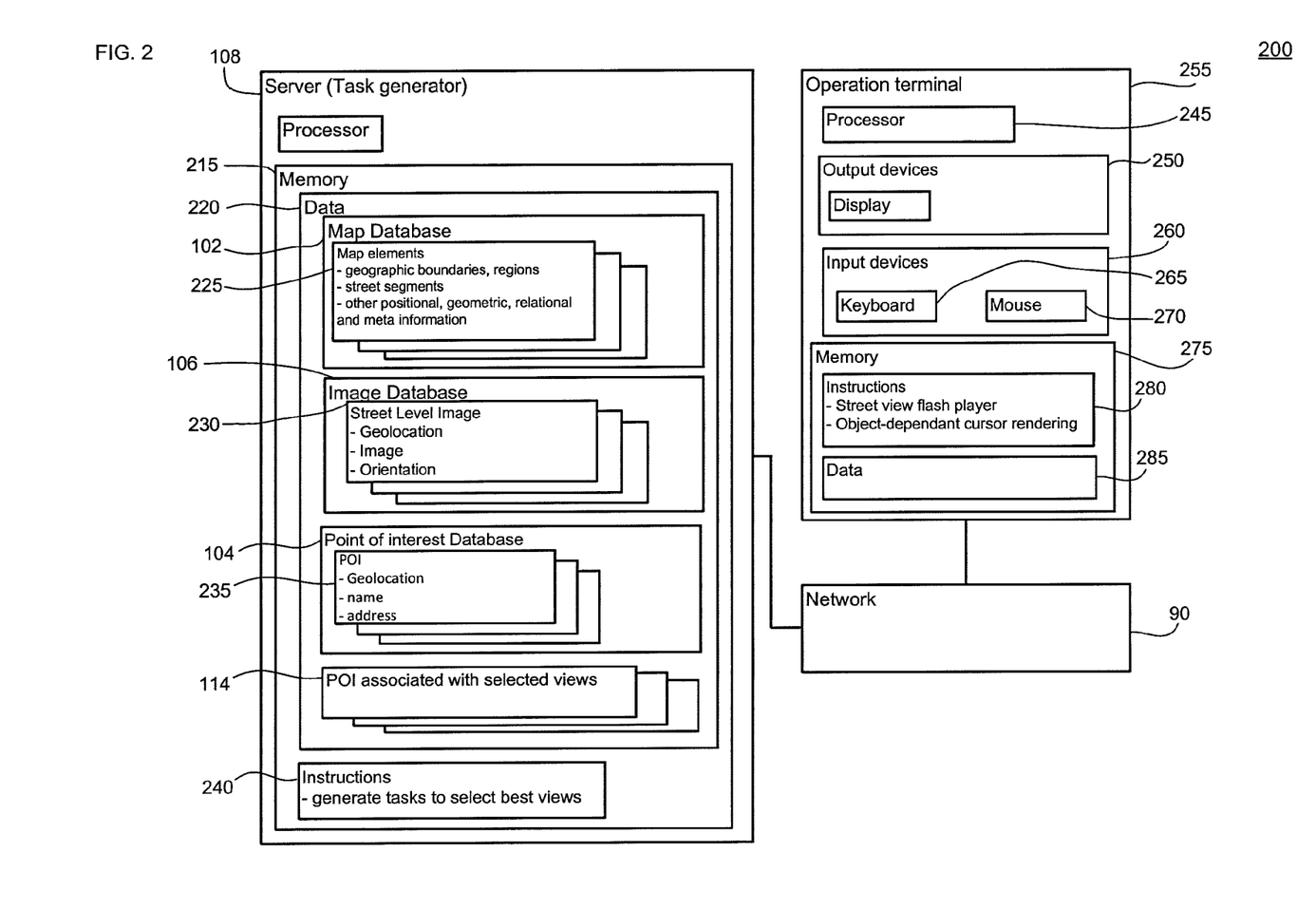
FIG. 2 is a functional diagram of aspects of the system of FIG. 1.

As shown in FIG. 1, a system 100 in accordance with aspects of the invention includes one or more databases 102, 104, 106 and 114, a task generator 108, and an operator management system 112. As illustrated in FIGS. 1 and 2, task generator 108 may be a computer server, and databases 102, 104, 106 and 114 may be distributed databases external to the server 108 or may internally locate on the server.

Map database 102 stores map-related information such as map tiles, where each tile comprises a map image of a particular geographic area. A single tile may cover an entire region such as a state in relatively little detail and another tile may cover just a few streets in high detail. In that regard, a single geographic point may be associated with multiple tiles, and a tile may be selected for transmission based on the desired level of zooming. The various map tiles are each associated with geographical locations, such that devices or systems such as task generator 108 may be capable of selecting, retrieving, transmitting, and/or displaying one or more tiles in response to receiving one or more geographical locations.

The map information is not limited to any particular format. For example, the images may comprise street maps, aerial oblique images, satellite images, or a combination of these, and may be stored as vectors (particularly with respect to street maps), bitmaps (particularly with respect to satellite images), or flat files.

The map database also stores various types of map elements such as elements 225 as shown in FIG. 2. The map elements may include elements such as street segments, regions of geographic objects (e.g., a park region), geographic boundaries such as city or county boundaries, etc. The database also include any type of detailed positional, geometric, relational, and meta information about known geographic entities (such as addresses, streets, parks, cities, states, countries).

The systems and methods in accordance with aspects of the invention may process locations expressed in different ways, such as latitude/longitude positions, street addresses, street intersections, an x-y coordinates with respect to the edges of a map (such as a pixel position when a user clicks on a map), names of buildings and landmarks, and other information in other reference systems that is capable of identifying a geographic locations (e.g., lot and block numbers on survey maps). Moreover, a location may define a range of the foregoing.

Locations may be further translated from one reference system to another. For example, a geocoder may convert a location identified in accordance with one reference system (e.g., a street address such as "1600 Amphitheatre Parkway, Mountain View, Calif.") into a location identified in accordance with another reference system (e.g., a latitude/longitude coordinate such as 37.423021°), −122.083939°). A location may be associated with absolute values such as latitude/longitude and/or relative values in any scale. Moreover, even if a first type of information is used (such as storing the latitude, longitude and altitude of the camera and surface), information of another type may be generated from it (such as using differences between latitude/longitude positions and altitudes to calculate distances). In that regard, it will be understood that exchanging or processing locations expressed in one reference system, such as street addresses, may also be received or processed in other references systems as well.

Database 104 stores information related to POI associated with the map data in database 102. Points of interest may include public spaces such as parks or other recreational areas, museums, vistas, private businesses such as gardens, shops, restaurants, real estate listings, etc. Information related to points of interest may include an initial approximate location of each POI, names and addresses of each POI, and/or other information related to the each POI.

In one example, database 106 stores images associated with the map data in database 102. These images may include static photographs of POI, streets, city blocks, regions, states, etc. These images may be taken by various types of devices and stored in various formats as noted above.

Figure 3A:
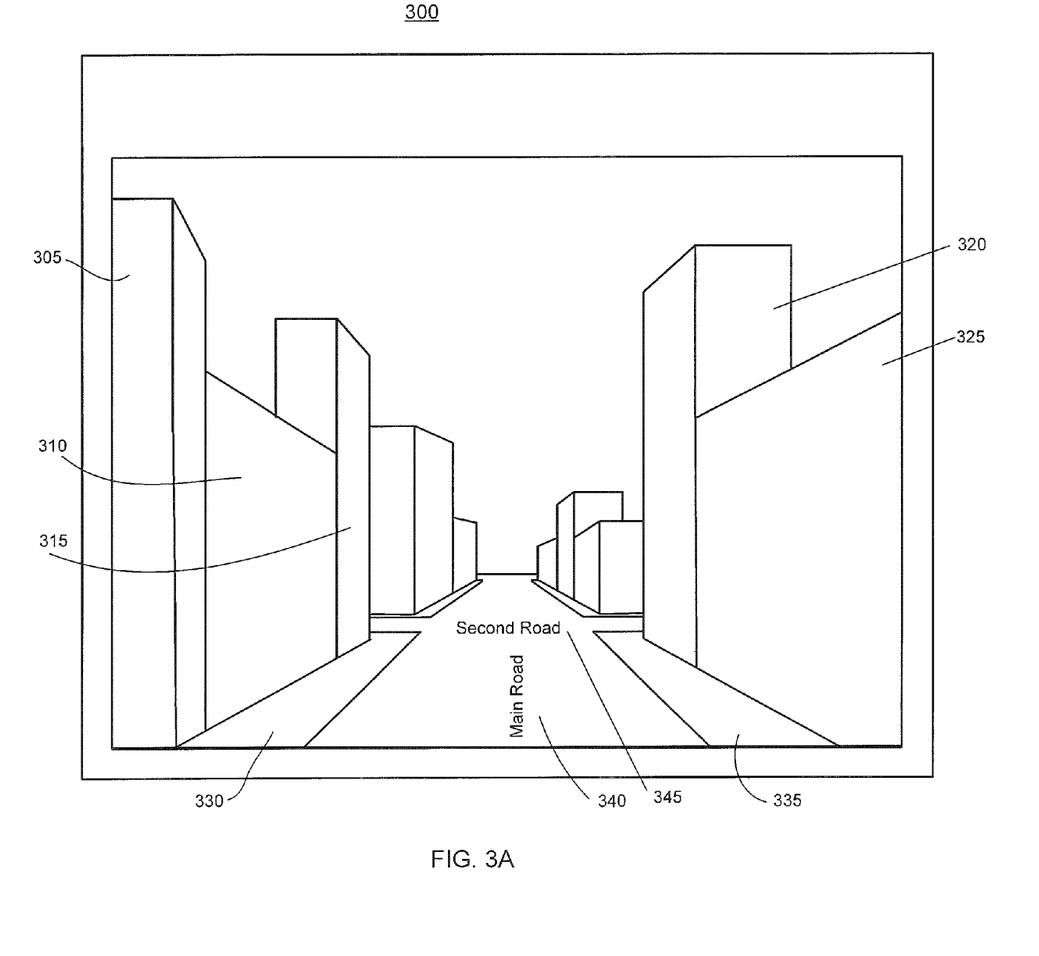
FIGS. 3A-B are exemplary street level images in accordance with aspects of the invention.

Database 106 may store street level images. Street level images comprise images of objects at geographic locations, captured by cameras at geographic locations, in a direction generally parallel to the ground. Thus, as shown in a street level image 300 in FIG. 3A, street level image data may represent various geographic objects such as buildings 305-325, sidewalks 330-335 and streets 340-345 from a perspective of a few feet above the ground and looking down the street. It will be understood that while street level image 300 only shows a few objects for ease of explanation, a typical street level image will contain as many objects associable with geographic locations (street lights, mountains, trees, bodies of water, vehicles, people, etc.) in as much detail as the camera was able to capture.

The street level image may be captured by a camera mounted on top of a vehicle, at a camera angle pointing roughly parallel to the ground and from a camera position at or below the legal limit for vehicle heights (e.g., 7-14 feet). Street level images are not limited to any particular height above the ground. For example, a street level image may be taken from the top of building.

The street level images tend to be taken at desired viewpoints at discrete locations. Separate streetview scenes may be stitched together to form a horizontal strip to provide the appearance of a continuous image to browse.

Interactive panoramas may be obtained by stitching individual streetview scenes from different camera angles, representing these images in certain specific map projections, such as equirectangular projection, and serving the images through a panoramic player after performing a series of image transformations (e.g., affirm transformations) or other known image processing techniques.

Each street level image may be stored as a set of pixels associated with color and brightness values. For example, if the images are stored in JPEG format, the image will be displayed as a set of pixels in rows and columns, with each pixel being associated with a value that defines the color and brightness of the image at the pixel's location.

In addition to being associated with geographic locations, street level images are typically associated with information indicating the orientation of the image. For example, if the street level image comprises a typical photograph, the orientation may simply be the camera angle, which in turn may be represented as an angle that is 30° East of true North and rises 2° from ground level. If the street level images are panoramic images, such as 360° panoramas centered at the geographic location associated with the image, the orientation may indicate the portion of the image corresponding with looking due North from the camera position at an angle directly parallel to the ground.

Street level images may also be stored in the form of videos, such as by displaying MPEG videos captured by an analog video camera or displaying, in succession, time-sequenced photographs that were captured by a digital still camera or a digital video camera.

System 100 also desirably comprises a task generator 108, which utilizes data from databases 102, 104 and 106 and performs various functions in accordance with aspects of the invention.

Task generator 108 may, based on the approximate geographic locations of each POI and geolocations associated with each image, link images in database 106 to relevant POI in database 104. Images related to a specific POI may include photographs taken for that particular POI (e.g., with the POI at the center of the image), photographs taken for the nearby POI or for the surrounding neighborhood, and street level images of the nearby streets, etc. For each POI, the task generator may also determine and store an initial viewing direction to bring the POI into view from a nearest street view image.

Figure 3B:
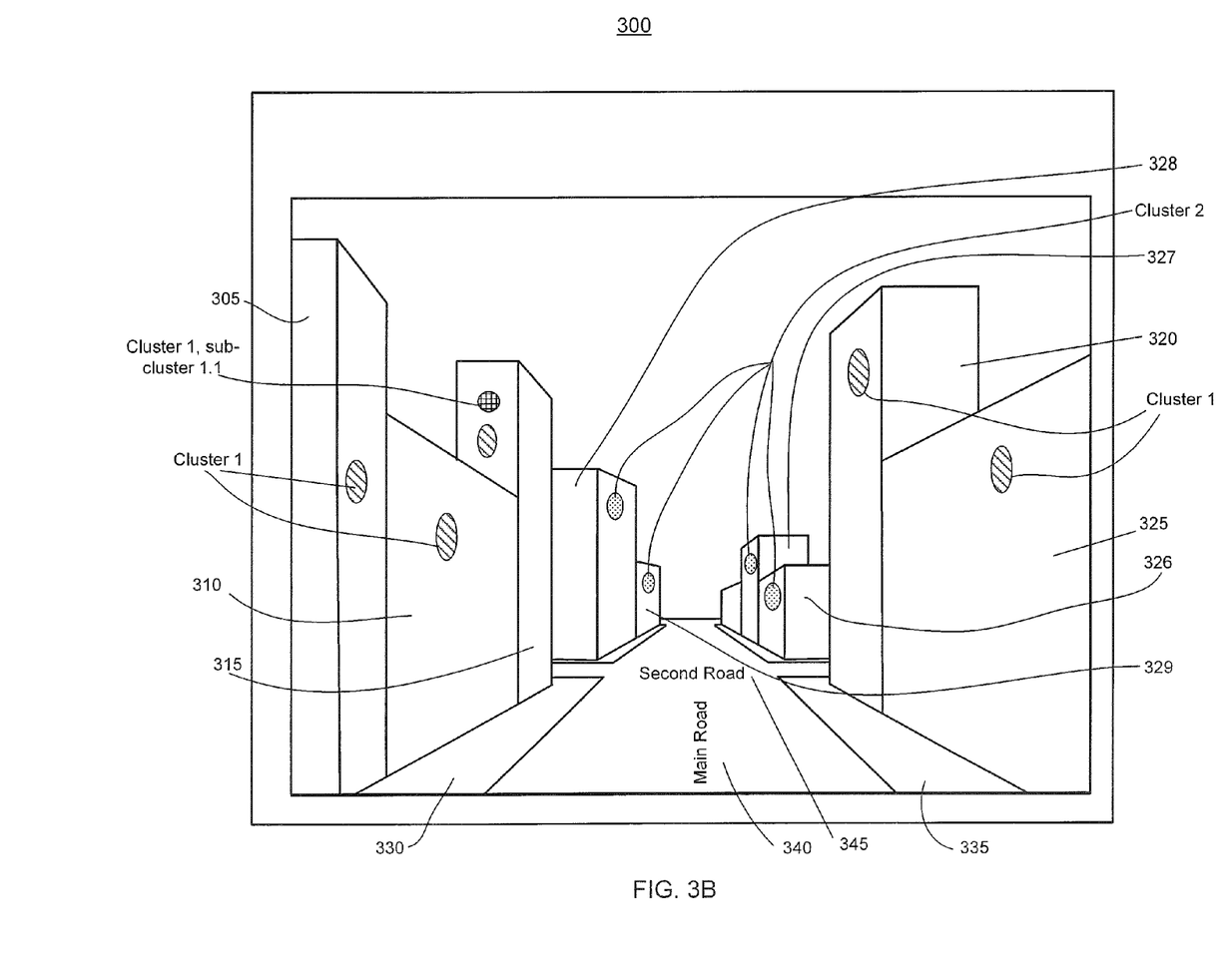

Task generator 108 may also cluster POI by street segments based on the street address of POI. The maximum number of POI in each cluster may be limited by a predetermined threshold or may be dynamically set by the task generator. When there are too many POI in a street segment, the task generator may break the segment into sub-segments, and divide the POI in the cluster into multiple layers of clusters. As an example illustrated in street image 300 of FIG. 3B, businesses in buildings 320 and 325 which reside on a particular street segment may all be put under the same cluster, such as cluster 1. Buildings on another side of the same street may also be put under the same road segment. Thus, businesses in buildings 305, 310 and 315, which reside on the West side of "Main Road" and opposite to buildings 320-325 and, may also be grouped under cluster 1. If the total number of businesses in this cluster (e.g., in buildings 305, 310 and 315) exceeds a maximum threshold, businesses in building 315 may be put under a separate sub-cluster one level below the main cluster 1, e.g., sub-cluster 1.1. In the street image, businesses in buildings 326 and 327, which reside on the East side of "Main Road" are put under cluster 2. Buildings 328 and 329, which reside on the West side of "Main Road" and opposite from buildings 326-327, may also be grouped in cluster 2. Thus, in street image 300, buildings on the South side of "Second Road" (buildings 305-325) are all grouped under cluster 1 and buildings on the North side of "Second Road" (buildings 326-329) are all grouped under cluster 2. Clusters and street segments may be designated in various formats and using any type of data structures, such as numbers, descriptive names, etc.

In one example, task generator 108 may also be configured to perform the function of determining one or more priority values for the POI data in database 104. The priority values may be determined based on various factors, for example, popularity data collected from, e.g., user survey or estimated values indicating the popularity among potential users, and/or perceived importance to the users of the map service. The priority values may also be determined by weighted combinations of a plurality of factors. In another example, the prioritization may be performed on one or more servers externally to the task generator and may be stored on one or more databases distributed over the network. Thus, the task generator may obtain the POI priority values from the server(s) performing the prioritization or from the external databases. Alternatively, priority information may be provided by third-party sources.

Based on the priority values of each POI, the task generator may generate tasks 110 for the POIs such that the tasks for POIs with higher priority values may be generated and presented to the operators earlier than the POIs with lower priority values. Different types of tasks may be generated. In one example, the task generator may generate one task for each cluster or sub cluster (cluster-type tasks). Each task may be generated and stored in the form of a question containing information related each POI in the cluster. The information includes, for example, the initial approximate geolocation of the POI, the name and address of the POI, the nearest street view image (preferably a panorama view) to the initial approximate location of the business, and an initial viewing direction to bring the POI into view from the nearest street view image.

In another example, the task generator may generate task for each POI already found in existing street imageries. Preferably, this type of task requests the operators to confirm and/or moderate a best view for the POI (a moderation task).

The task generator may perform prioritization on tasks already generated based on factors such as the priority values of the POI in the task (e.g., based on the mean priority value of the total priority values), population density of the relevant street/neighborhood, and/or any other relevant factors. Then the task generator may present the tasks to the operator management system 112 according to the task priority.

Tasks 110 are presented to operators through graphical user interfaces, such as computer displays, based on their priority values. Thus, tasks with higher priorities are presented to the operators and are completed earlier than the tasks with lower priorities. Desirably, the task generator presents to the operators a single task each time per operator. Each task provides relevant instructions to the operators to find each POI in the cluster within one or more street views that are presented to the operators, and to navigate through the street views to find and a best view for the POI.

Upon receiving each task, the operator answers the question by searching for the listed POI in the street views, selecting and associating a best view for the POI, and submitting the answers. When answers for all the POI in the question are submitted, the current task is finished and the next task is presented to the operators. As discussed above, the order of the tasks presented to the operators may be based on the priority values of the POI in the tasks.

The answers submitted by the operators may be stored in a separate database 114 for POIs found in street images and associated with a selected view. Various types of data structures may be employed to represent an answer. As discussed below, a selected view for a particular POI may be stored as a data structure that contains the identified street level image and the selected viewpoint within the image.

FIG. 2 shows a system block diagram in accordance with aspects of the invention. As illustrated, a system 200 includes the task generator 108 and an operation terminal 255. The task generator and the operation terminal may communicate over network 90.

As shown in FIG. 2, the task generator 108 may be a computer (server) that contains a processor 210, memory 215 and other components typically present in general purpose computers.

Processor 210 may be any conventional processor, such as off-shelf processors from Intel Corporation or Advanced Micro Devices. Alternatively, the processor may be a dedicated device such as an ASIC.

Memory 215 stores information accessible by processor 210, including instructions 240 that may be executed or otherwise used by the processor 120. It also includes data 220 that may be retrieved, manipulated or stored by the processor. The memory may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

Instructions 240 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions may include, for example, algorithms for calculating priority values for the POI and generating tasks for clusters of the POI based on street segments and POI priority values.

Data 220 may be retrieved, stored or modified by processor 210 in accordance with the instructions 240. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

As illustrated, data 220 may include map database 102, image database 106 and point of interest database 104. These databases may reside on computer 108, or may be distributed over the network as shown in FIG. 1. Map database 102 may store map tile information and various types of map elements 225. The map elements may include elements such as street segments, regions of geographic objects (e.g., a park region), geographic boundaries such as city or county boundaries, etc. The database also include any type of detailed positional, geometric, relational, and meta information about known geographic entities (such as addresses, streets, parks, cities, states, countries). Image database 106 may store street level images 230 and various other types of images such as static photographs or video data. Point of interest database 104 may include information 235, such as geolocation, name and address of the POI. Processor may execute instructions 240 to access these databases and retrieve data from therein. As previously mentioned, operators may perform the task of associating a best view for each POI and the POI with their respective best views, such as data 114, may be stored in the server 108.

Although FIG. 2 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. For another example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel. Accordingly, references to a processor or a computer or a memory will be understood to include references to a collection of processors or computers or memories that may or may not operate in parallel.

The computer 108 may be at one node of a network 90 and capable of directly and indirectly communicating with other nodes of the network. For example, computer 108 may send the tasks generated by instruction 240 to another computer, operation terminal 255, at another node of the network. Operation terminal 255 may be one of many computer terminals operated by the operators in the human operator management system 112 in FIG. 1.

Server 108 may also comprise a plurality of computers that exchange information with different nodes of a network for the purpose of receiving, processing and transmitting data to the operation terminals. In this instance, the operation terminals will typically still be at different nodes of the network than any of the computers comprising server 108.

Each operation terminal 255 may be configured similarly to server 108, with a processor 245, memory 275 that contains instructions 280 and data 285. Each operation terminal may be a computer device intended for use by a human operator in the operator system 112 and may have all of the components normally used in connection with a computer such as a central processing unit (CPU), memory (e.g., RAM and internal hard drives) storing data and instructions such as a web browser, a street view flash player, object-dependent cursor rendering, etc.

The operation terminal also includes, by way of example, output devices 250, input devices 260 and various other elements typically found on a computer terminal. For example, output devices may include an electronic display (e.g., a monitor having a screen, a small LCD touch-screen, a projector, a television, a computer printer or any other electrical device that is operable to display information), through which operators may view, manipulate street level images and perform the tasks for finding best views. Input devices 260 may include keyboard 265, touch-screen (not shown), and/or mouse or track pad 270.

Network 90, and intervening nodes between server 108 and operation terminal 255, may comprise various configurations and use various protocols including local area network, virtual private networks, local Ethernet networks, private networks using communication protocols proprietary to one or more companies, cellular and wireless networks (e.g., WiFi), HTTP and SMTP, and various combinations of the foregoing. Although only a few computers are depicted in FIGS. 1-2, it should be appreciated that a typical system can include a large number of connected computers. Such communication may be facilitated by any device capable of transmitting data to and from other computers, such as Ethernet network interfaces, T1 lines, fiber optic cables, and/or wireless interfaces.

Although certain advantages are obtained when information is transmitted or received as noted above, other aspects of the system and method are not limited to any particular manner of transmission of information. For example, in some aspects, information may be sent via a medium such as a disk, tape, CD-ROM or solid-state memory such as a flash drive. In other aspects, the information may be transmitted in a non-electronic format and manually entered into the system. Yet further, although some functions are indicated as taking place on a server and others on a client, various aspects of the system and method may be implemented by a single computer having a single processor.

Figure 4:
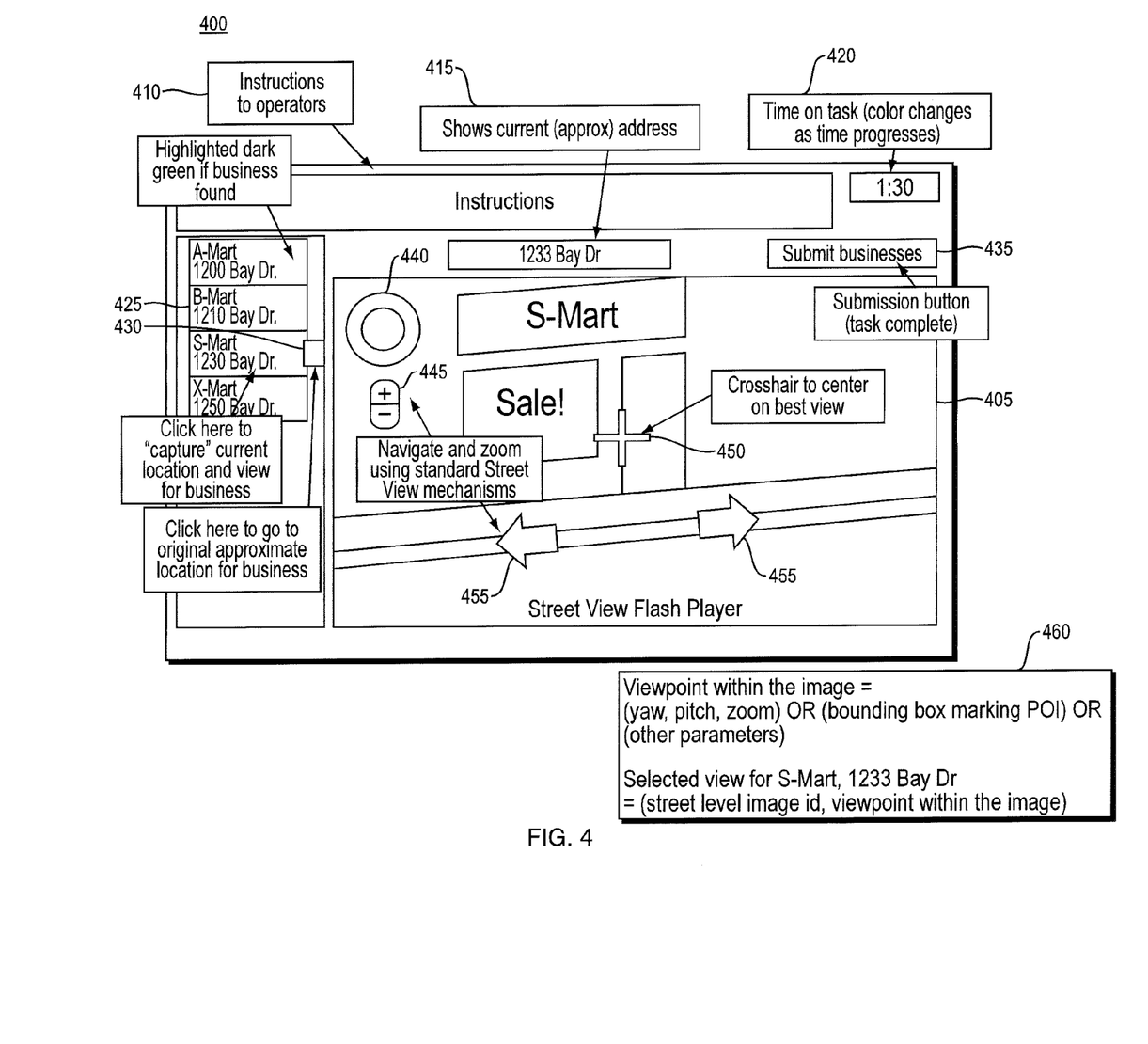
FIG. 4 is an exemplary screen shot in accordance with aspects of the invention.

FIG. 4 illustrates an exemplary screen shot 400 that may be displayed by the operation terminal's display device. As shown, a street view flash player may display a street image 405 and other related information. Alternatively, the street level image may also be displayed on an Internet browser such as Google Chrome (not shown) displaying a web page showing a street image 405 and other information.

As discussed above, each task presented to the operator to perform contains information related with the POI in the task. Systems and methods may include information in each task such as the name and address of the POI and one or more street view images of the street segment where the POI in the task are expected to be located. For each POI, systems and methods may select a nearest street view image as the initial image to be displayed for that POI and store the information in the task. Screen shot 400 shows a task list 425 that contains a plurality of POIs in the task. Street image 405 is associated with POI "S-Mart" located on "1230 Bay Dr" and is displayed in a street view flash player on the screen.

Sometimes, one or more images associated with a task may be corrupted or for other reasons can no longer be retrieved from the associated databases (e.g., the street view database and/or the task database). In this situation, systems and methods may query the relevant databases for other street view images, look for the street view images of the nearest streets, and associate these nearest street view images to the task.

The user interface may be flexibly configured to include various types of buttons, cursors, tools as well as the contents and the formats of the contents on the display. As shown in FIG. 4, the street level image 400 may be shown in a street view flash player along with user-selectable controls, such as control buttons 440-445 and cursor crosshair 450, for changing the location or orientation of the viewpoint. The operators may perform through the user interface navigation operations such as drag, yaw, pitch, zoom, and other operations typically found in a street view application.

For instance, controls 440-445 may be used for zooming the image in and out, as well as changing the orientation of the view, such as changing the direction from looking north to looking east. Operators may also change the location of the viewpoint. For example, the operator may move the viewpoint forwards or backwards in the currently-viewed direction by maneuvering controls 440, 445 or 450. Crosshair 450 may also be used to center on the viewport.

Other navigation controls may be included as well, such as controls 455 in the form of arrows disposed along a street that may be selected to move the vantage point up or down the street. Operators may also operate the arrow controls of a keyboard to change the zoom, direction or location of the view. Operators may further select portions of the image, such as by moving and clicking a computer mouse or tapping a touch-sensitive screen, to select and move closer to the objects displayed in the image.

Depending on the type of street level image data associated with the task, a change in viewpoint may necessitate the display switched from one street level image to another. In one example, the street level image 405 in FIG. 4 may correspond with the location of "S-Mart" and a direction of west to east is represented by arrows 455. If an operator uses arrows 455 to move the location eastward, the nearest street level image in the east direction may be located at a position to the east of S-Mart, e.g., the position of "X-Mart". In another example, if the street level image was downloaded as an entire 360° panorama, changing the direction of the view may necessitate only displaying a different portion of the same panorama.

Systems and methods may allow operators to navigate to nearby streets to find a best view for a POI. Alternatively, various constraints may be placed on the geographical boundary the operator could navigate, e.g., the nearest streets within one block or within a certain range (e.g., on the order of feet, miles, kilometers, etc.).

As illustrated, systems and methods may render a POI in the task and relevant information to be displayed as a list, such as list 425. The list may be sorted in an alphabetic order of the name or street address or another order. Operators may be provided control buttons (not shown) to change the sort order and return to the original sort order. Operators may also click on each POI in the list to bring the street level image associated with the POI to be displayed. After a best view has been found, the operator may click on the POI in the list to record the view. Control buttons to return to the original approximate location of each POI may be provided, such as button 430. The color of the POI may be configured such that the color changes once the POI is found or identified (once the operator submits a best view for the respective POI).

Systems and methods may render various helpful tools and information to be displayed on the user interface. For example, the approximate address 415 of the POI currently being displayed on the screen may be shown on top of the street level image. Instructions 410 may be provided on the user interface to instruct operators on how to locate POI, find and record a best view and or other information to facilitate with performing the task. For example, the instructions may instruct operators to center the view on the POI and zoom in as necessary, or as much as possible so the POI may barely fit on the screen. Instructions may also direct the operators to submit answers to the task within a certain time frame even if not all POI in the task can be found during the time frame. A timer 420 may be provided with capability of changing color when time progresses. A button 435 may also be provided for submitting a POI when a best view has been found and recorded. One or more bounding boxes (not shown) may also be provided through the user interface to mark the areas of interest (e.g., the front door or sign of the business) and to record the viewpoint.

In the above example, the POI in a task is presented to the operator and displayed on the user interface all at once. Alternatively, the POI in each task may be presented to the operators one by one, or in sub-groups, and in a desired order.

Once the operator submits the best view answer for a POI in a cluster-type task, the answer is recorded and may be used as an initial viewport in a moderation task for the POI. The best view answer has a structure that contains the associated street level image identifier and the selected viewpoint or a region within the associated image. Data structure 460 shows an exemplary answer structure to record a selected view. The data structure refers to a mapping from the POI "S-Mart, 1233 Bay Dr" to a specific viewpoint with the associated image: {street level image ID, viewpoint within the image}. In one example, the viewpoint within the street level image (e.g., 405) may be recorded to include parameters such as {yaw, pitch, zoom} to indicate the orientation and location within the image. In another example, the viewpoint may also be recorded in the form of one or more bounding boxes marking the areas of interest, such as the front door or sign of the business. Alternatively, the viewpoint may be recorded in the form of various other parameters derived from the image and/or the operations within the image or a combination of the above-mentioned parameters (yaw, pitch, zoom, bounding box, and/or other parameters).

The system and method may record a data structure for each POI similar to structure 460, which may be referred to as a "viewcode" of a geolocation point. Viewcodes may be further processed to incorporate other data formats and be used by various systems or services for purposes such as improving the geolocation of the POI utilizing a 3D façade depth map or a fixed depth in the absence of 3D façade.

Figure 5:
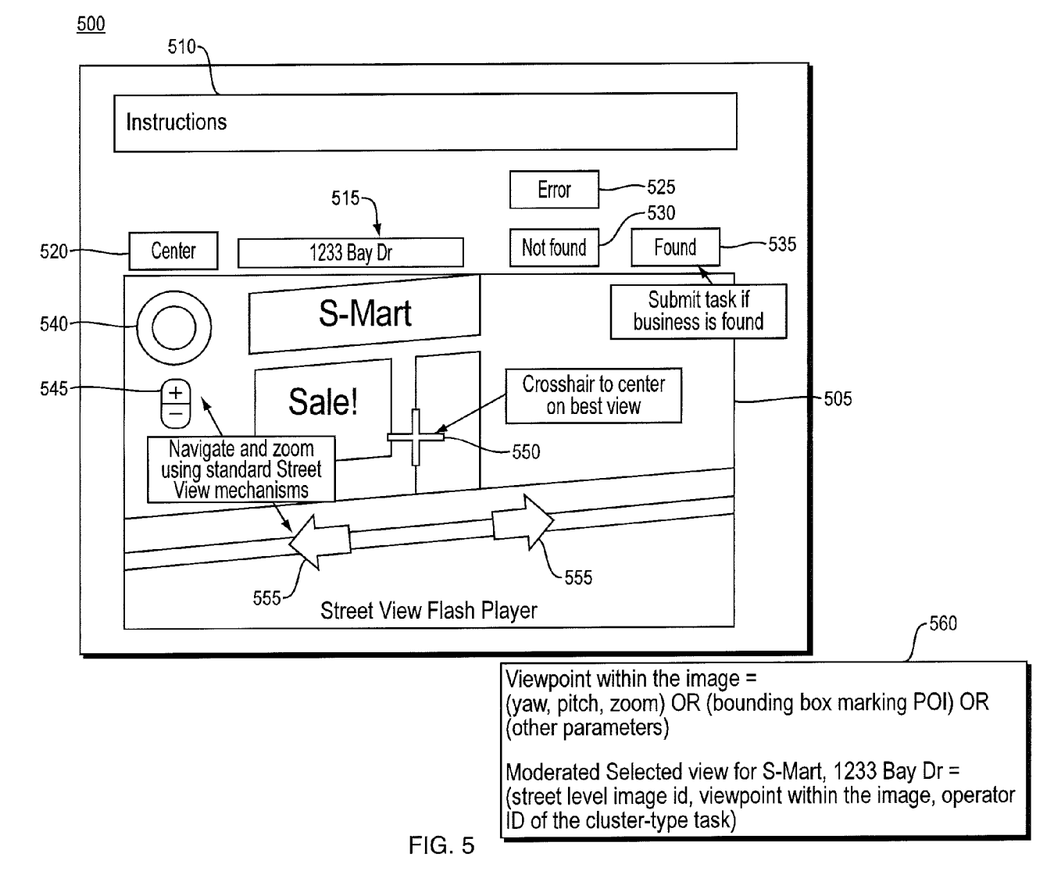
FIG. 5 is an exemplary screen shot in accordance with aspects of the invention.

FIG. 5 illustrates an exemplary screen shot 500 of a moderation task. A viewport 505 is displayed for POI "S-Mart". In this example, viewport 505 was supplied as the answer for POI "S-Mart" in a cluster-type task and is used as the default starting viewport for moderation task for each POI. Similar to FIG. 4, various types of control tools, such as buttons 540-545, crosshair 550 and arrows 555 along a street may be provided through the user interface to facilitate operators to navigate the street level images. However, in a moderation task, these tools may only facilitate navigations within the street image being displayed for the particular task, and the function of street image changing may be disabled. Alternatively, some of the control tools that perform the function of changing street images (e.g., navigation arrows and/or click-to-go buttons), may not be provided on the user interface. One or more bounding boxes (not shown) may also be provided to the operator to facilitate marking the areas of interest (such as the front door or sign of the business) and recording the viewpoint.

Moderation task may be based on the viewcodes generated in the cluster-type tasks, as described with regard to FIG. 4. Instructions 510 in the moderation task may ask operators to confirm if the POI in the task indeed exists and/or is apparent in the associated image. Operators may also be asked to further adjust and refine the viewcode of the POI through operations such as yaw, pitch and zoom. The refined viewcode may be recorded and used to overwrite the original viewcode associated with the POI.

Controls tools facilitating the moderation task are also provided through the user interface. These tools include, but not limited to, center button 520 to center on the viewport, error button 525 to flag that an error condition occurs (e.g., no image being displayed), not-found button 530 to indicate that the POI cannot be seen in the viewport, and found button 535 to submit the task when the POI is found.

Answer 560, which represents the moderated "best view", has a structure similar to viewcode answer 460. It contains an associated street level image identifier and a viewpoint or a region within the image. It may also contain an identifier of the operator that submits the cluster-type task which contains the POI being displayed in the moderation task. This may help to collect statistics with regard to the performance of the operators in the cluster-type tasks. The viewpoint or region within the image may include parameters such as yaw, pitch and zoom or may be recorded in the form of one or more bounding boxes marking the areas of interest, such as the front door or sign of the business, or in the form of various other parameters derived from the image and/or the operations within the image, or a combination of the above-mentioned parameters (yaw, pitch, zoom, bounding box, and/or other parameters).

Figure 6:
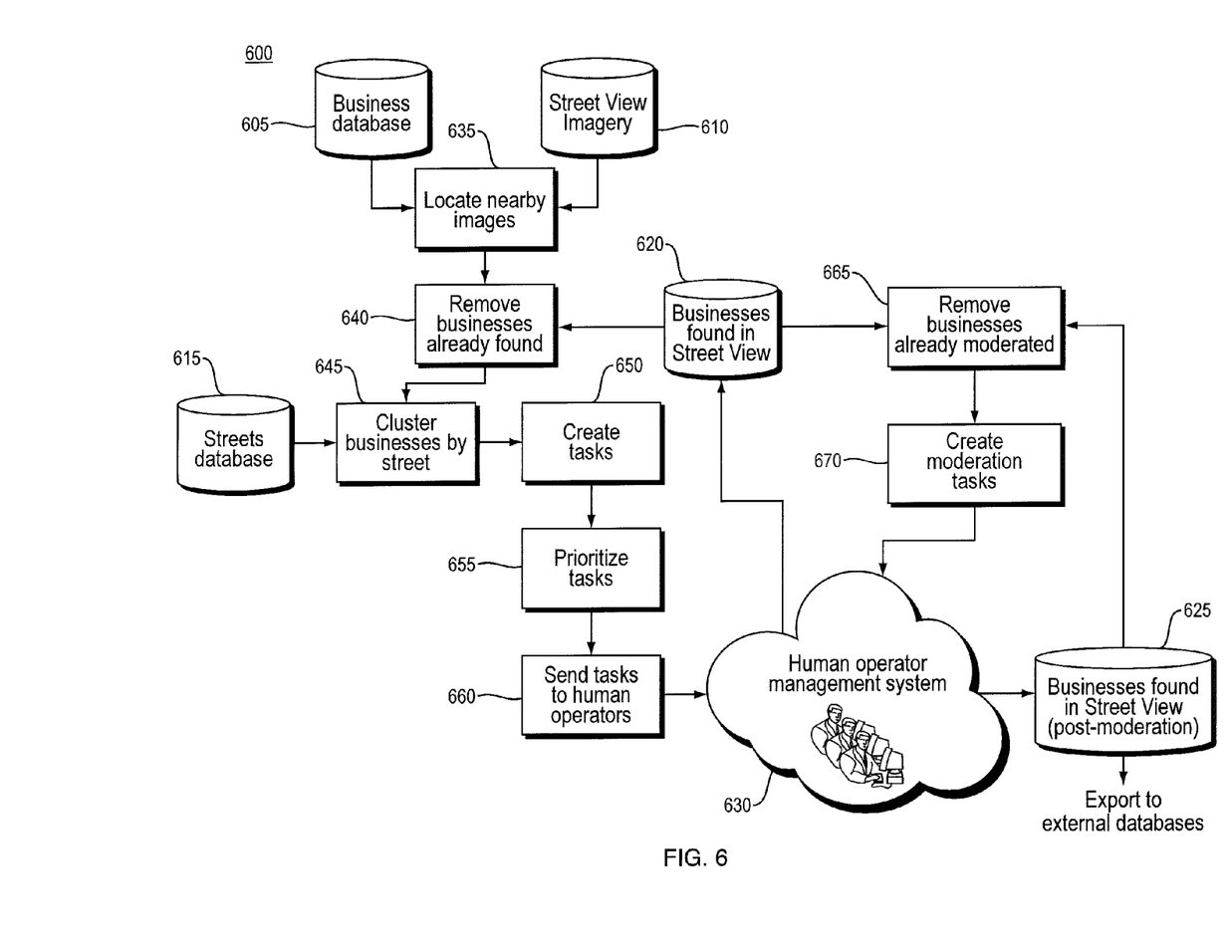
FIG. 6 is a system process chart in accordance with aspects of the invention.

Operations in accordance with aspects of the invention will now be described with reference to FIG. 6, which illustrates a system process chart 600 in accordance with aspects of the invention. It should be understood that the following operations do not have to be performed in the precise order described below. Rather, various operations can be handled in a different order or simultaneously. It should also be understood that these operations do not have to be performed all at once. Rather, some operations may be performed separately from other operations.

In block 635, the system may locate nearby images for POI by correlating POI data in database 605 and street view imagery database 610. In block 640, the system may, with reference to data from database 620 that stores the POI already found in street view images, check if there is any POI from database 605 that has already been found (also exists in database 620) and remove these POI from further processing.

Cluster-type (multi-POI) tasks may be generated in blocks 645-660. Specifically, in block 645, the system may cluster the POI by street segment based on the geographical data from street database 615. In block 650, tasks to find best views for POI in each cluster may be created and the system may further prioritize these tasks in block 655. In block 660, the system sends these tasks to the operator system 630.

Moderation tasks may be generated in blocks 665-670. In block 665, the system may survey the POI in database 620 and remove those already been moderated from further processing. In block 670, moderation tasks are created for those POI that have been found but not moderated yet. Moderated POI may be stored in database 625, exported to other databases and used by other systems, services and applications.

Systems and methods according to aspects of the invention are not limited to businesses or POI, nor limited to street view images or panoramas, but may be used for any desired geographic location point with any suitable image data.

It will be further understood that the sample values, types and configurations of data described and shown in the figures are for the purposes of illustration only. In that regard, systems and methods in accordance with aspects of the invention may include various types of networks, transmission devices, operation terminals, servers, data values, data types and configurations. The systems and methods may be provided and received at different times (e.g., via different servers or databases) and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Unless expressly stated to the contrary, every feature in a given embodiment, alternative or example may be used in any other embodiment, alternative or example herein. For instance, any method for determining the priority of POI and/or other geographic locations or tasks may be employed in any configuration herein. Each way of clustering POI and/or other geographical locations may be used in any configuration herein. Any operation terminal may be used with any of the configurations herein. Any data structure for representing a view within one or more images and mapped to a geographical location may be employed.

The invention claimed is:

1. A method of generating a view for a geographic object, the method comprising:
    providing, with one or more processors, information related to a geographic object and a first image related to the geographic object on an electronic display;
    receiving, with the one or more processors, user input indicating a presence of the geographic object in the first image;
    determining, with the one or more processors based on user manipulation of the first image with respect to the geographic object, a viewpoint within the first image, the user manipulation including one or more user operations comprising at least one of (i) yaw, pitch, zoom operations, and (ii) bounding-box drawing operations;
    associating, with the one or more processors, the viewpoint, the first image and the information related to the geographic object; and
    storing, with the one or more processors, the association in a database.

2. The method of claim 1, further comprising determining a priority value for the geographic object relative to other geographic objects in a plurality of geographic objects.

3. The method of claim 2, wherein determining the priority value comprises determining a popularity level of the geographic object relative to other geographic objects.

4. The method of claim 2, further comprising displaying the plurality of geographic objects based on the determined priority value of each respective geographic object.

5. The method of claim 2, further comprising dividing the plurality of geographic objects into clusters based on geolocation of each respective geographic object.

6. The method of claim 5, further comprising determining a cluster priority value for each respective cluster and displaying the clusters based on the determined cluster priority values.

7. The method of claim 1, wherein the viewpoint comprises parameters indicating a position within the first image and indicating the user operations within the first image.

8. The method of claim 1, further comprising determining a second image based on the association as a default initial image to be displayed for the geographic object in a mapping application and displaying the second image in the mapping application.

9. The method of claim 1, further comprising displaying a plurality of additional images related to the geographic object.

10. A system of generating a view for a geographic object, the system comprising:
    an electronic display device;
    a user input device;
    one or more processors in communication with the electronic display device and the user input device and configured to process information received from the user input device;
    a memory coupled to the processor, the memory storing instructions executable by the processor, the instructions comprising:
    displaying, on the electronic display, information related to a geographic object and a first image related to the geographic object;
    receiving, from the user input device, user input indicating a presence of the geographic object in the first image;
    determining, based on user manipulation of the first image with respect to the geographic object, a viewpoint within the first image, the user manipulation including one or more user operations comprising at least one of (i) yaw, pitch, zoom operations, and (ii) bounding-box drawing operations;
    associating the viewpoint, the first image and the information related to the geographic object; and
    storing the association in the memory.

11. The system of claim 10, further comprising instructions for determining a priority value for the geographic object relative to other geographic objects in a plurality of geographic objects.

12. The system of claim 11, wherein the instructions for determining the priority value comprise instructions for determining popularity level of the geographic object relative to other geographic objects.

13. The system of claim 11, further comprising instructions for displaying on the electronic display device the plurality of geographic objects based on the determined priority value of each respective geographic object.

14. The system of claim 11, further comprising instructions for dividing the plurality of geographic objects into clusters based on geolocation of each respective geographic object.

15. The system of claim 14, further comprising instructions for determining a priority value for each respective cluster and instructions for displaying the clusters based on the determined priority values on the electronic display device.

16. The system of claim 10, wherein the viewpoint comprises parameters indicating a position within the first image and indicating the user operations within the first image.

17. The system of claim 10, further comprising instructions for determining a second image based on the association as a default initial image to be displayed for the geographic object in a mapping application and instructions for displaying the second image in the mapping application on the electronic display device.

18. The system of claim 10, further comprising instructions for displaying a plurality of additional images related to the geographic object.

* * * * *